(12) United States Patent  
Iwasaki

(10) Patent No.: US 7,564,911 B2  
(45) Date of Patent: Jul. 21, 2009

(54) COMMUNICATION SYSTEM AND TRANSMITTER-RECEIVER FOR USE THEREWITH

(75) Inventor: Motoya Iwasaki, Tokyo (JP)

(73) Assignee: NEC Corporation (JP)

( * ) Notice: Subject to any disclaimer, the term of this patent is extended or adjusted under 35 U.S.C. 154(b) by 618 days.

(21) Appl. No.: 11/311,347

(22) Filed: Dec. 20, 2005

(65) Prior Publication Data  
US 2006/0133531 A1   Jun. 22, 2006

(30) Foreign Application Priority Data  
Dec. 22, 2004   (JP)   ............................. 2004-370322

(51) Int. Cl.  
*H04K 1/10*   (2006.01)  
*H04L 1/02*   (2006.01)

(52) U.S. Cl. ...................................... 375/260; 375/267

(58) Field of Classification Search ................. 375/260, 375/267, 285, 295–297, 316, 349, 358; 455/68, 455/69, 70, 114.2  
See application file for complete search history.

(56) References Cited  
U.S. PATENT DOCUMENTS  
7,257,167 B2 *   8/2007   Lau ............................ 375/295

2003/0236069 A1    12/2003   Sakata et al.  
2005/0041750 A1 *   2/2005   Lau ............................ 375/267  
2005/0163236 A1 *   7/2005   Hammerschmidt et al. . 375/260  
2005/0213552 A1 *   9/2005   Bar-Ness et al. ............ 370/342  
2005/0213682 A1 *   9/2005   Han et al. .................... 375/267

FOREIGN PATENT DOCUMENTS  
JP   2003-332963   11/2003  
JP   2003-348057   12/2003

* cited by examiner

*Primary Examiner*—Khanh C Tran  
(74) *Attorney, Agent, or Firm*—Dickstein, Shapiro, LLP.

(57) ABSTRACT

To achieve the optimal power control of a system in an MIMO communication method.

When decoding in accordance with a receiving algorithm of the MIMO communication method in plural receivers, each receiver acquires the reception power level of a received signal from a transmitter paired with the receiver, and generates a transmitter power control signal based on a comparison result of comparing the reception power with a predetermined value. For example, if the reception power level is lower than the predetermined value, a transmitter power control signal of instructing to increase the transmitter power is generated, or otherwise, a transmitter power control signal of instructing to decrease the transmitter power is generated. The generated control signal is transmitted from the receiver to the transmitter paired with the receiver. Each transmitter controls the transmitter power in accordance with the received control signal.

7 Claims, 5 Drawing Sheets

COMMUNICATION SYSTEM AND TRANSMITTER-RECEIVER FOR USE THEREWITH

BACKGROUND OF THE INVENTION

1. Field of the Invention

The present invention relates to a communication system and a transmitter-receiver for use therewith, and more particularly to power control in an MIMO (Multiple Input Multiple Output) communication method.

2. Related Art

In a personal radio communication system, the higher communication rate has been achieved owing to the broadband. One of the techniques is a method called an MIMO (refer to Japanese Patent Laid-Open No. 2003-348057). In the MIMO communication method, each of a transmitter 1 and a receiver 2 is provided with a plurality of antennas, in which high speed data to be transmitted is divided into N and transmitted via respective antennas on the transmitter 1, and the transmitted data is restored by making a predetermined signal processing for the signals received by M ($M \geq N$) antennas on the receiver 2, as shown in FIG. 3.

That is, in the transmitter 1, the data to be transmitted is divided into N by a data division part 11, and transmitted via N transmitting circuits 12-1 to 12-N from N antennas. In the receiver 2, the transmitted data is received via M antennas and receiving circuits 21-1 to 21-M, whereby data is restored by a data synthesis part 22.

The data is transmitted at N times the rate in a frequency band according to the speed of signal transmitted from each antenna. Since different signals transmitted from plural antennas in this way are added and received on the receiving side, the signals transmitted from respective antennas can not be directly separated. Therefore, plural antennas are prepared on the receiving side, whereby the signals are separated by analyzing plural signal rows received through different transmission channels.

As an application example of this MIMO communication method, the MIMO communication may be implemented by connecting plural communication apparatuses that do not make the MIMO communication in the normal mode, as disclosed in Japanese Patent Laid-Open No. 2003-332963. In FIG. 4, the transmitters 1-1 to 1-N and receivers 2-1 to 2-M are independent of each other in the normal mode, but in making the MIMO communication, the MIMO communication apparatus is made by connecting plural transmitters and receivers.

The transmission data inputted into the transmitter 1-1 is firstly divided by the data division part 11, one of the data being transmitted from an antenna via a transmitting circuit 12, and the other being outputted to the transmitter 1-2. In the transmitter 1-2, the data from the transmitter 1-1 is also divided, one of the data being transmitted from an antenna, and the other being outputted to the transmitter 1-3. In this way, the transmission data is divided and transmitted from N transmitters, whereby the data of N times the transmitting capability in the normal mode can be transmitted.

On the receiving side, data received in a receiving circuit 21 of each of the receivers 2-1 to 2-M is synthesized by a data synthesis part 22, and decoded in accordance with an MIMO receiving algorithm. In this way, the signals from the transmitters 1-1 to 1-N are received by M receivers, whereby the high speed reception is achieved by the MIMO communication method.

In the case where the MIMO conFIGuration as described above is not taken, it is common that the transmitter power of the transmitting side is controlled in accordance with a feedback signal from the receiving side, as shown FIG. 5. That is, in the receiver 2, a power control signal is generated from a received signal of the receiving circuit 21 by a power control signal generation part 23, and transmitted via a transmitting circuit 24. In the transmitter 1, this power control signal is received by a receiving circuit 13 and a power control signal extraction part 14, whereby the transmitter power of the transmitting circuit 12 is controlled based on the received power control signal.

If such a general transmitter power control method is directly applied to the MIMO conFIGuration, the power control signal is generated based on the reception power in each receiver, independently, whereby there is a drawback that the optimal transmitter power can be made as the entire system.

BRIEF SUMMARY OF THE INVENTION

It is an object of the present invention to provide a communication system and a transmitter-receiver for use therewith in which the power control of the system in the MIMO communication method can be optimally controlled.

The present invention provides a communication system in which a signal to be transmitted is divided into N and transmitted from N transmitters, and the signals transmitted from the N transmitters are received by M receivers ($M \geq N$), the signals transmitted from the N transmitters being synthesized in each of the M receivers, the system comprising, in each of the M receivers to be paired as defined beforehand with each of the N transmitters, control information generation means for generating transmitter power control information for the transmitter paired with the receiver, based on the received signal from the transmitter paired with the receiver, and transmitting means for transmitting the transmitter power control information to the transmitter paired with the receiver.

The invention provides a receiver for use in a communication system in which a signal to be transmitted is divided into N and transmitted from N transmitters, and the signals transmitted from the N transmitters are received by M receivers ($M \geq N$), the signals transmitted from the N transmitters being synthesized in each of the M receivers, the receiver comprising control information generation means for generating transmitter power control information for the transmitter paired with the receiver, based on the received signal from the transmitter paired with the receiver, and transmitting means for transmitting the transmitter power control information to the transmitter paired with the receiver.

Also, the invention provides a transmitter for use in a communication system in which a signal to be transmitted is divided into N and transmitted from N transmitters, and the signals transmitted from the N transmitters are received by M receivers ($M \geq N$), the signals transmitted from the N transmitters being synthesized in each of the M receivers, the transmitter comprising means for receiving transmitter power control information which is generated based on a received signal from the transmitter in the receiver paired with the transmitter, and means for controlling the transmitter power based on the transmitter power control information.

The operation of the invention will be described below. In decoding in accordance with a receiving algorithm of the MIMO communication method on the receiver side, each receiver generates the transmitter power control information according to a received signal from the transmitter paired with the receiver. For example, the reception power level of the received signal is compared with a predetermined reference value, and if the reception power level is lower than the predetermined reference value, the transmitter power control information of instructing to increase the transmitter power is generated, or otherwise, the transmitter power control information of instructing to decrease the transmitter power is generated. The generated transmitter power control information is transmitted to the transmitter paired with the receiver, and the transmitter controls the transmitter power in accordance with the received transmitter power control information.

When each receiver generates the transmitter power control information, the reception quality of the received signal from the transmitter paired with the receiver may be measured, and compared with a predetermined reference reception quality, whereby the transmitter power control information may be generated based on this comparison result.

DETAILED DESCRIPTION OF THE PREFERRED EMBODIMENTS

Figure 1:
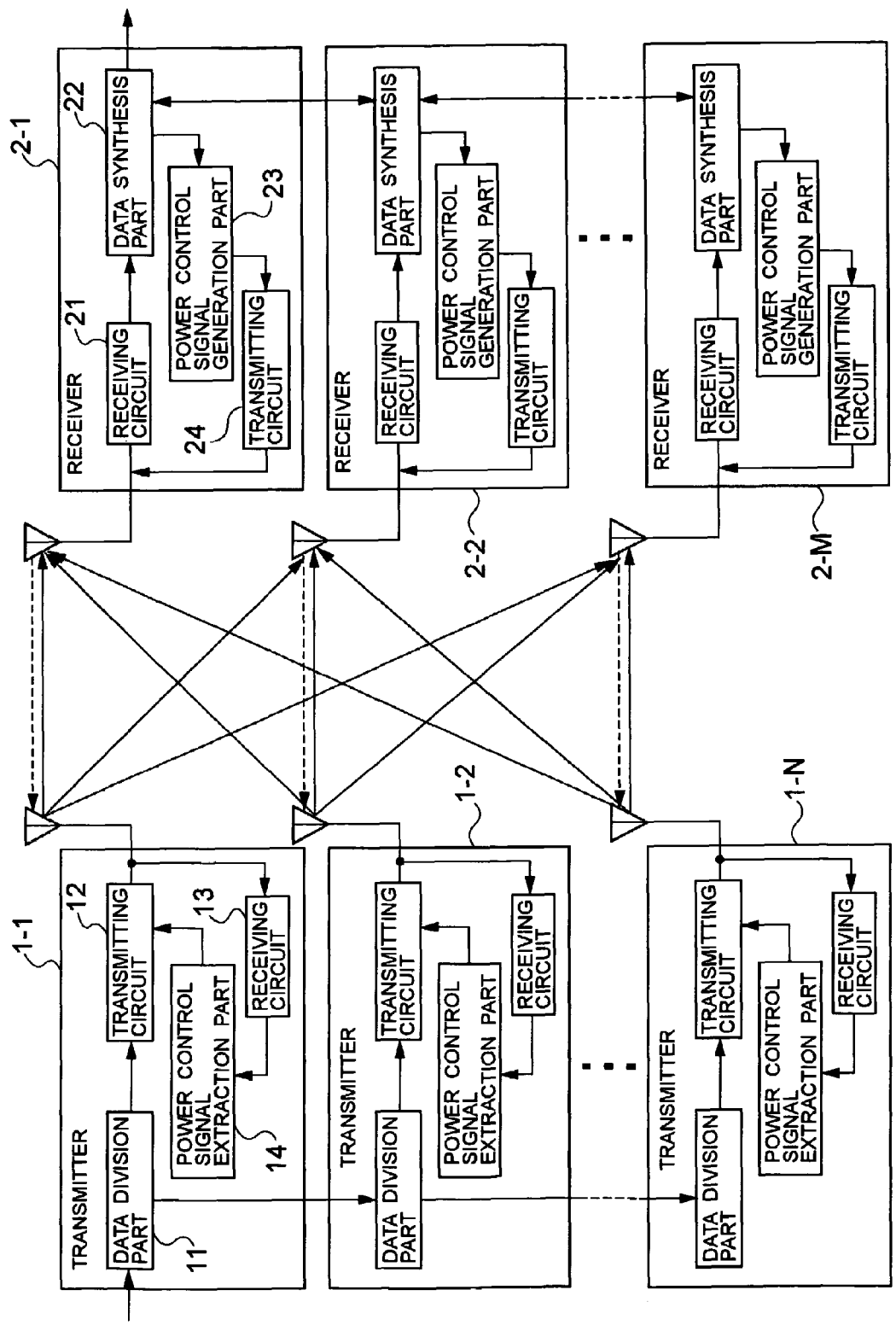
FIG. 1 is a diagram showing an embodiment of the present invention.

The embodiments of the present invention will be described below with reference to the drawings. FIG. 1 is a block diagram of a communication system according to an embodiment of the invention. It is supposed that transmitters 1-1 to 1-N and receivers 2-1 to 2-M (M≧N) are independent and individual transmitters and receivers in the normal mode. In making the MIMO communication, an MIMO communication apparatus is constructed by connecting the transmitters 1-1 to 1-N and connecting the receivers 2-1 to 2-M, as shown in FIG. 1.

Figure 3:
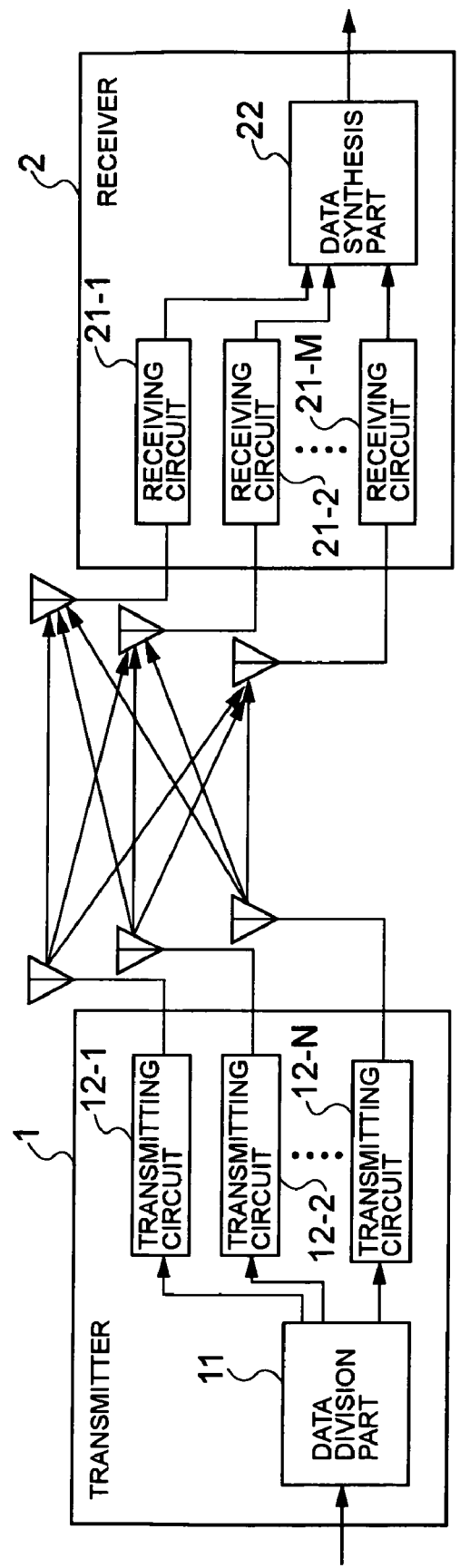
FIG. 3 is a diagram showing one example of the prior art.
Figure 4:
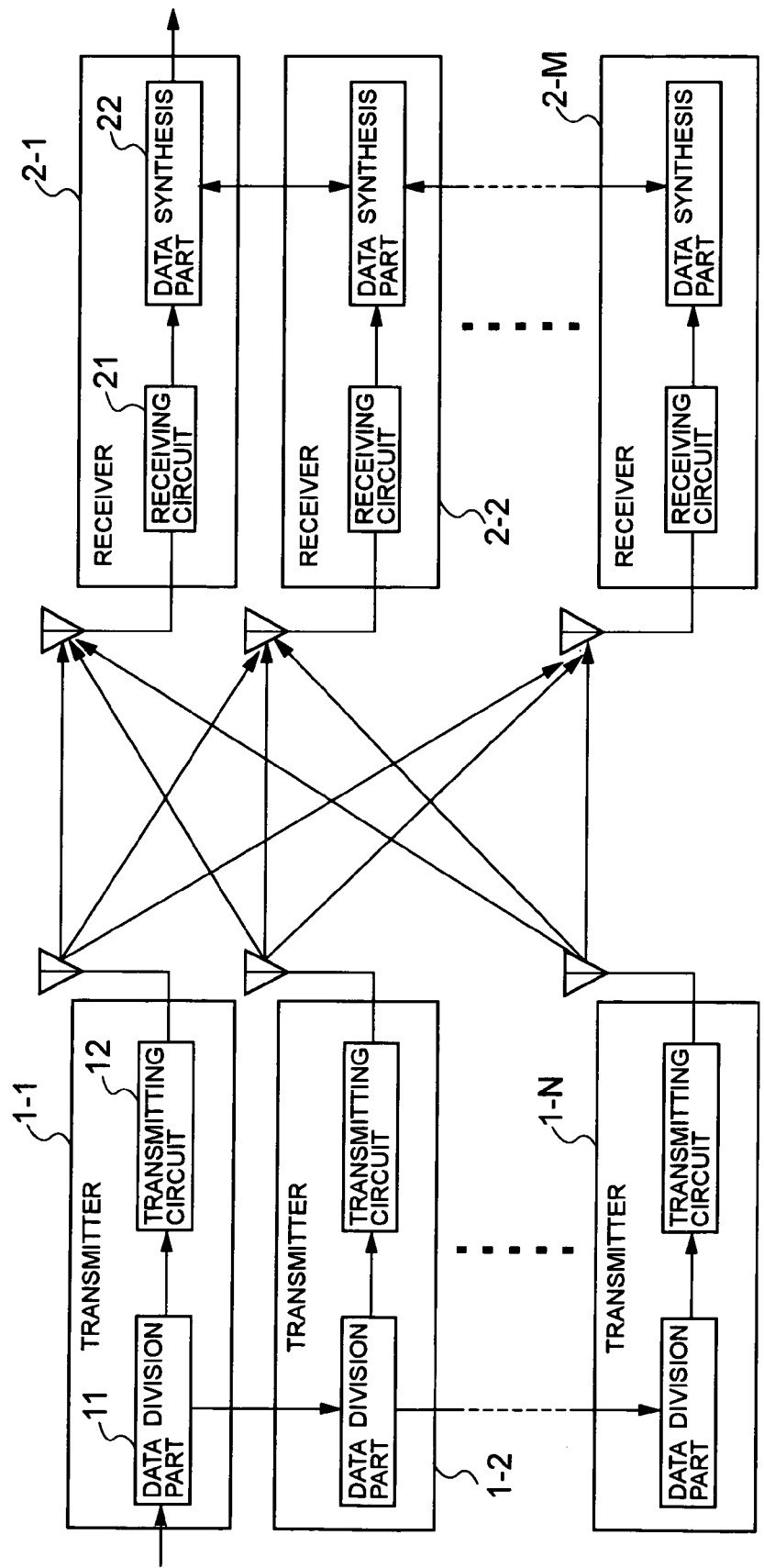
FIG. 4 is a diagram showing another example of the prior art.
Figure 5:
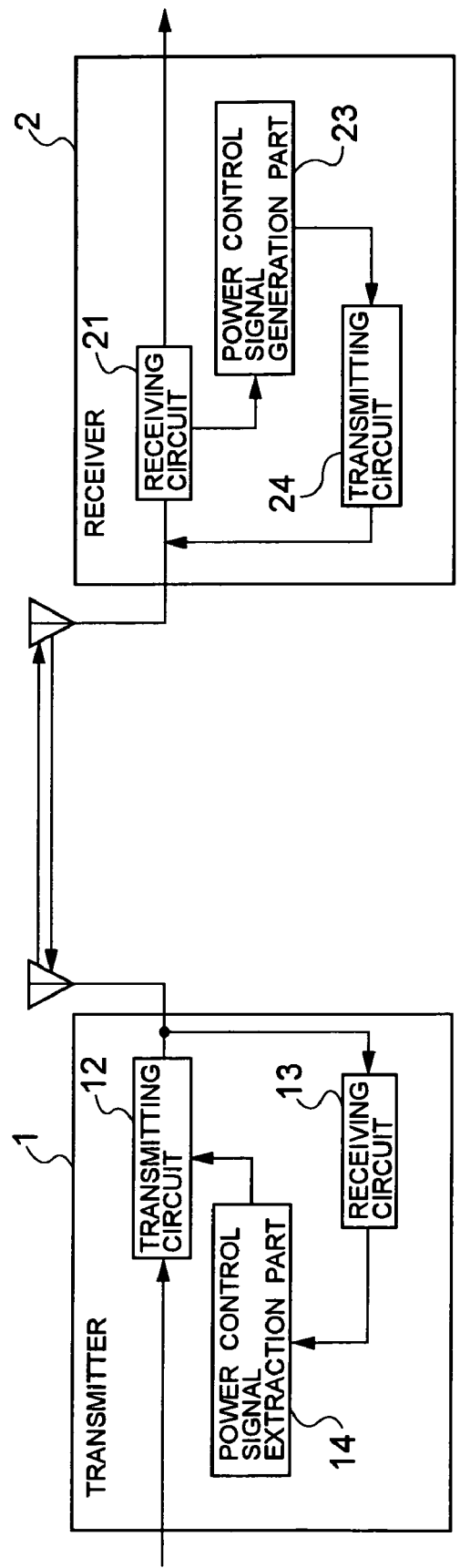
FIG. 5 is a diagram showing a further example of the prior art.

In FIG. 1, the same or like parts are designated by the same reference numerals as in FIG. 3. All the transmitters 1-1 to 1-N have the same conFIGuration, and all the receivers 2-1 to 2-M have the same conFIGuration.

Referring to FIG. 1, the transmission data inputted into the transmitter 1-1 is firstly divided by a data division part 11, one of the data being transmitted from an antenna via a transmitting circuit 12, and the other being outputted to the transmitter 1-2. In the transmitter 1-2, the data from the transmitter 1-1 is also divided, one of the data being transmitted from an antenna of the transmitter 1-2, and the other being outputted to the transmitter 1-3. In this way, the transmission data is divided and transmitted from N transmitters, whereby data of N times the transmitting capability in the normal mode can be transmitted.

On the receiving side, data received in a receiving circuit 21 of each of the receivers 2-1 to 2-M is synthesized by a data synthesis part 22, and decoded in accordance with an MIMO receiving algorithm. In this way, the signals from the transmitters 1-1 to 1-N are received by M receivers, whereby the high speed reception is achieved by the MIMO communication method. The above-mentioned conFIGuration and operation are the same as with the conventional method of FIG. 3.

Herein, M receivers 2-1 to 2-M to be paired with N transmitters 1-1 to 1-N are defined beforehand. Because of M≧N, each of the transmitters 1-1 to 1-N is necessarily paired with one receiver.

In each of the receivers 2-1 to 2-M, the data synthesis part 22 decodes data in accordance with the MIMO algorithm, and a transmitter power control signal for the transmitter paired with the receiver is generated based on the received signal from the transmitter paired with the receiver. And each of the transmitters 1-1 to 1-N controls the transmitter power in accordance with the transmitter power control signal from the receiver paired with the transmitter. In FIG. 1, M=N, and the transmitter power control signal is indicated by the dotted line.

Figure 2:
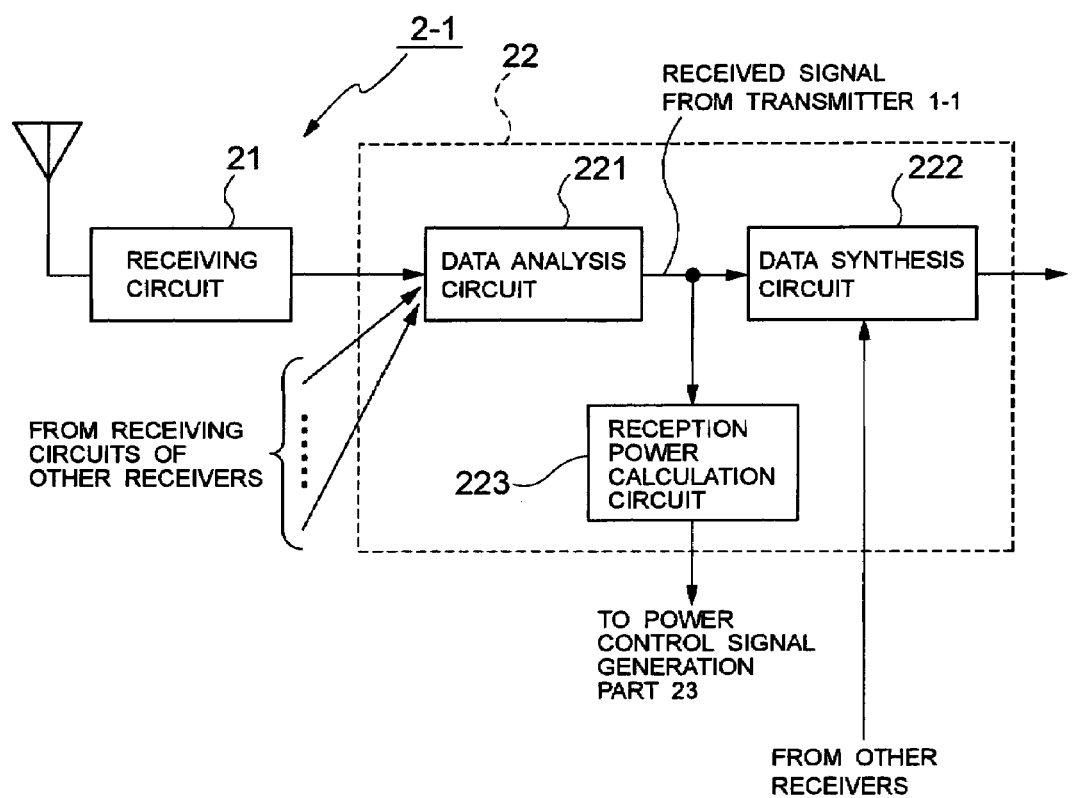
FIG. 2 is a diagram for explaining the details of a data synthesis part 22 in FIG. 1.

Referring to FIG. 2, the details of the data synthesis part 22 of the receiver will be described below. FIG. 2 shows only the data synthesis part 22 of the receiver 2-1, but the other receivers have the same conFIGuration of the data synthesis part. The data synthesis part 22 has a data analysis circuit 221, a data synthesis circuit 222, and a reception power calculation circuit 223. The data synthesis part 22 inputs a received signal from the receiving circuit 21, into which the signals from all the transmitters 1-1 to 1-N are received via the antenna of the receiver 2-1 and inputted. The data analysis circuit 221 inputs this received signal, and also inputs the output signals from the receiving circuits of other receivers (the signal lines for inputting the output signals from the receiving circuits of other receivers are omitted for the simplicity in FIG. 1).

The reason is that the received data can be analyzed and synthesized more correctly in each receiver, employing the received signals via the antennas in other receivers, in addition to the received signal via the antenna in the receiver, in the MIMO communication method. Hence, the data analysis circuit 221 operates to extract only the received signal from the transmitter 1-1 paired with the receiver 2-1 from the signals received at the receivers 2-1 to 2-M.

This extraction method will be described below. Since the signal from each transmitter contains a pilot signal inherent to the transmitter to help reception in the receiver, this pilot signal is extracted from the received signal, whereby the signal from the transmitter 1-1 is identified and extracted.

Thus, in the data analysis circuit 221 of the receiver 2-1, the received signal from the transmitter 1-1 paired with the receiver 2-1 is only extracted based on the pilot signal. The data synthesis circuit 222 of the receiver 2-1 synthesizes the received signal from the transmitter 1-1 that is extracted in this way with the received signals from the transmitters 1-2 to 1-N that are similarly extracted in the receivers 2-2 to 2-M, and outputs the synthesized signal. The received signal from the transmitter 1-1 that are obtained in the data analysis circuit 221 of the receiver 2-1 is inputted into the reception power calculation circuit 223, where the reception power of the received signal from the transmitter 1-1 paired with the receiver 2-1 is calculated. This calculated reception power is outputted to a power control signal generation part 23 of the receiver 2-1.

Similarly, in each of the receivers 2-2 to 2-M, the reception power level of the received signal from the transmitter paired with the receiver is calculated by the data synthesis part 22 of the receiver, and supplied to the power control signal generation part 23 of the receiver.

In the power control signal generation part 23 of the receiver 2-1, the reception power level calculated in this way is compared with a predetermined reference value. As a result of comparison, if the reception power level is lower, a transmitter power control signal of instructing to increase the transmitter power is generated, or otherwise, a transmitter power control signal of instructing to decrease the transmitter power is generated, whereby the transmitter power control signal is transmitted from a transmitting circuit 24 of the receiver 2-1 to the transmitter 1-1 paired with the receiver 2-1. The above operation is similarly performed in the receivers 2-2 to 2-M.

In each of the transmitters 1-1 to 1-N, the transmitter power control signal from the receiver paired with the transmitter is received by a receiving circuit 13 and extracted by a power control signal extraction part 14, whereby the transmitter power of a transmitting circuit 12 is controlled in accordance with the transmitter power control signal. In this way, the transmitter power of each transmitter is controlled at a predetermined value by controlling the transmitter power of the transmitter, whereby the optimal transmitter power as the entire system can be achieved.

The predetermined reference value for generating the transmitter power control signal is selected to be an optimal value required for the communication system. For example, the predetermined reference value may be preferably selected so that an SIR (Signal to Noise Ratio) or a BLER (Block Error Rate) indicating the reception quality of the received signal becomes a predetermined value or its neighboring value.

In the above embodiment, the transmitter power control signal is transmitted from the receiving side to the transmitting side. In another embodiment of the invention, a difference between the reception power level and the predetermined value is calculated on the receiving side, and the information of this difference is transmitted from the receiving side to the transmitting side, and extracted on the transmitting side. The transmitting side controls the transmitter power so that the power corresponding to the level of the difference is added to the transmitter power.

Also, in the above embodiment, the reception power level of the received signal from the transmitter is employed to generate the transmitter power control signal in each receiver. In a further embodiment, the reception quality like SIR or BLER of the received signal from the transmitter is measured on the receiving side, this measured reception quality is compared with a predetermined reception quality (target quality), and the transmitter power control information for the transmitter paired with the receiver is generated based on the comparison result.

That is, if the measured reception quality is worse than the predetermined reception quality, the transmitter power control information for instructing to increase the transmitter power is generated, or otherwise, the transmitter power control information for instructing to decrease the transmitter power is generated.

In this case, the transmitter power control information corresponding to a difference between the measured reception quality and the predetermined reception quality is transmitted to the transmitter paired with the receiver, which increases or decrease the transmitter power in accordance with the transmitter power control information. Also, the information of the difference between the measured reception quality and the predetermined reception quality may be transmitted from the receiving side to the transmitting side. In this case, the information of the difference is extracted on the transmitting side, whereby the transmitter power is controlled so that the power corresponding to the level of the difference is added to the transmitter power.

The transmitter power control signal may be transmitted or received by point-to-point communication method. For example, a CDMA (Code Division Multiple Access) method or a TDMA (Time Division Multiple Access) method may be employed, but the invention is not limited to those methods.

With the invention, the high speed communications with the MIMO communication method is achieved by combining the transmitters or receivers used for the normal purposes, with the effect that the power of each transmitter can be made proper.

What is claimed is:

1. A communication system in which a signal to be transmitted is divided into N and transmitted from N transmitters, and the signals transmitted from said N transmitters are received by M receivers (M≧N), the signals transmitted from said N transmitters being synthesized in each of said M receivers, said system comprising, in each of said M receivers to be paired as defined beforehand with each of said N transmitters:

control information generation means for generating transmitter power control information for the transmitter paired with the receiver, based on the received signal from the transmitter paired with the receiver; and transmitting means for transmitting said transmitter power control information to the transmitter paired with the receiver, wherein said control information generation means generates said transmitter power control information based on the reception power level of said received signal from the transmitter paired with the receiver, and wherein said control information generation means generates said transmitter power control information in accordance with a comparison result of comparing said reception power level with a predetermined power level.

2. The communication system according to claim 1, wherein said received signal from the transmitter paired with the receiver is extracted from the signals received by said M receivers.

3. The communication system according to claim 1, wherein said system comprises, in each of said N transmitters, transmitter power control means for controlling the transmitter power based on said transmitter power control information from the receiver paired with the transmitter.

4. A communication system in which a signal to be transmitted is divided into N and transmitted from N transmitters, and the signals transmitted from said N transmitters are received by M receivers (M≧N), the signals transmitted from said N transmitters being synthesized in each of said M receivers, said system comprising, in each of said M receivers to be paired as defined beforehand with each of said N transmitters:

control information generation means for generating transmitter power control information for the transmitter paired with the receiver, based on the received signal from the transmitter paired with the receiver; and transmitting means for transmitting said transmitter power control information to the transmitter paired with the receiver wherein said control information generation means generates said transmitter power control information based on the reception quality of said received signal from the transmitter paired with the receiver, and wherein said control information generation means generates said transmitter power control information in accordance with a comparison result of comparing said reception quality with a predetermined reception quality.

5. A receiver for use in a communication system in which a signal to be transmitted is divided into N and transmitted from N transmitters, and the signals transmitted from said N transmitters are received by M receivers (M≧N), the signals transmitted from said N transmitters being synthesized in each of said M receivers, said receiver comprising:

control information generation means for generating transmitter power control information for the transmitter paired with the receiver, based on the received signal from the transmitter paired with the receiver; and transmitting means for transmitting said transmitter power control information to the transmitter paired with the receiver wherein said control information generation means generates said transmitter power control information based on the reception power level of said received signal from the transmitter paired with the receiver, and wherein said control information generation means generates said transmitter power control information in accordance with a comparison result of comparing said reception power level with a predetermined power level.

6. The receiver according to claim 5, wherein said received signal from the transmitter paired with the receiver is extracted from the signals received by said M receivers.

7. A receiver for use in a communication system in which a signal to be transmitted is divided into N and transmitted from N transmitters, and the signals transmitted from said N transmitters are received by M receivers ($M \geq N$), the signals transmitted from said N transmitters being synthesized in each of said M receivers, said receiver comprising:

control information generation means for generating transmitter power control information for the transmitter paired with the receiver, based on the received signal from the transmitter paired with the receiver; and transmitting means for transmitting said transmitter power control information to the transmitter paired with the receiver wherein said control information generation means generates said transmitter power control information based on the reception quality of said received signal from the transmitter paired with the receiver, and wherein said control information generation means generates said transmitter power control information in accordance with a comparison result of comparing said reception quality with a predetermined reception quality.

* * * * *